(12) United States Patent
Dadd

(10) Patent No.: US 7,245,101 B2
(45) Date of Patent: Jul. 17, 2007

(54) SYSTEM AND METHOD FOR MONITORING AND CONTROL

(75) Inventor: Michael William Dadd, Oxford (GB)

(73) Assignee: ISIS Innovation Limited, Oxford (GB)

( * ) Notice: Subject to any disclaimer, the term of this patent is extended or adjusted under 35 U.S.C. 154(b) by 321 days.

(21) Appl. No.: 10/474,905

(22) PCT Filed: Apr. 17, 2002

(86) PCT No.: PCT/GB02/01782

§ 371 (c)(1),
(2), (4) Date: Oct. 16, 2003

(87) PCT Pub. No.: WO02/086640

PCT Pub. Date: Oct. 31, 2002

(65) Prior Publication Data

US 2004/0119434 A1 Jun. 24, 2004

(30) Foreign Application Priority Data

Apr. 19, 2001 (GB) .................................. 0109643.7

(51) Int. Cl.
*G05B 13/00* (2006.01)
*G05B 23/02* (2006.01)
*G05B 13/02* (2006.01)
*G05B 19/29* (2006.01)
*H02K 41/00* (2006.01)

(52) U.S. Cl. ........................... 318/561; 700/28; 700/29; 700/52; 318/135; 318/565; 318/600

(58) Field of Classification Search ............ 700/28–33, 700/35, 47, 45, 52, 73, 104; 702/104; 318/565; 318/568.24, 561
See application file for complete search history.

(56) References Cited

U.S. PATENT DOCUMENTS 4,584,869 A * 4/1986 Frodsham ............... 123/406.38

(Continued)

FOREIGN PATENT DOCUMENTS

DE 195 14 535 10/1998

OTHER PUBLICATIONS

Bo Peterson; "Induction Machine Speed Estimation, Observations on Observers";Industrial Electrical Engineering and Automation (IEA) Lund Institute of Technology (LTH) http://www.iea.lth.se/; Copyright 1996.

*Primary Examiner*—David Vincent
*Assistant Examiner*—Jennifer L. Norton
(74) *Attorney, Agent, or Firm*—Nixon & Vanderhye, PC

(57) ABSTRACT

The invention provides for the monitoring and control of a system, such as a linear electro-mechanical transducer, e.g. a linear electric motor, particularly when driven in a reciprocating manner. A dynamic model of the linear motor and its load is used to calculate from the input drive to the motor a predicted response of the motor. The predicted response is compared to a measured response and the model parameters are varied by global optimisation until the two match as closely as desired. The drive may be the voltage input to the electrical motor and the response may be the electrical current in the motor coils. The parameters and variables of the model, after optimisation, can be taken as good estimates of the actual operating parameters and variables of the linear motor. This gives a measurement of such quantities as the stoke and offset of the linear motor. The invention is particularly applicable to the use of linear motors to drive compressors, for instance in Stirling cycle coolers. The system can be applied to balanced pairs of compressors and to compressor systems which use an active balancer to cancel vibration in the system. In this case a balancer model is created and used in an analogous way to the motor model.

44 Claims, 12 Drawing Sheets

U.S. PATENT DOCUMENTS

| | | | | |
|---|---|---|---|---|
| 5,274,313 A | * | 12/1993 | Amrhein | 318/629 |
| 5,296,794 A | * | 3/1994 | Lang et al. | 318/715 |
| 5,342,176 A | | 8/1994 | Redlich | 417/212 |
| 5,384,696 A | * | 1/1995 | Moran et al. | 363/40 |
| 5,489,829 A | * | 2/1996 | Umida | 318/561 |
| 5,598,076 A | * | 1/1997 | Neubauer et al. | 318/568.22 |
| 5,705,989 A | * | 1/1998 | Cota et al. | 340/660 |
| 5,834,918 A | * | 11/1998 | Taylor et al. | 318/601 |
| 5,842,149 A | * | 11/1998 | Harrell et al. | 702/9 |
| 6,085,183 A | | 7/2000 | Horn et al. | |
| 6,208,953 B1 | | 3/2001 | Milek et al. | |
| 6,242,873 B1 | * | 6/2001 | Drozdz et al. | 318/139 |
| 6,289,680 B1 | * | 9/2001 | Oh et al. | 62/6 |
| 6,534,954 B1 | * | 3/2003 | Plett | 320/132 |
| 6,587,737 B2 | * | 7/2003 | Voser et al. | 700/30 |
| 6,630,808 B1 | * | 10/2003 | Kliffken et al. | 318/466 |
| 6,785,641 B1 | * | 8/2004 | Huang | 703/7 |
| 6,876,943 B2 | * | 4/2005 | Wegerich | 702/127 |
| 7,003,380 B2 | * | 2/2006 | MacMartin et al. | 700/280 |
| 7,020,595 B1 | * | 3/2006 | Adibhatla et al. | 703/7 |
| 2002/0053894 A1 | * | 5/2002 | Shishkin et al. | 318/727 |
| 2003/0201745 A1 | * | 10/2003 | Hayashi | 318/561 |
| 2003/0225719 A1 | * | 12/2003 | Juang et al. | 706/48 |
| 2004/0160228 A1 | * | 8/2004 | Jamneala et al. | 324/601 |

FOREIGN PATENT DOCUMENTS

| | | |
|---|---|---|
| DE | 197 13 181 | 10/1998 |
| DE | 197 13 182 | 10/1998 |
| EP | 1 085 635 | 3/2001 |
| WO | WO 97/12300 | 4/1997 |

* cited by examiner

SYSTEM AND METHOD FOR MONITORING AND CONTROL

This application is the U.S. national phase of international application PCT/GB02/01782, filed Apr. 17, 2002, which designated the U.S.

BACKGROUND AND SUMMARY

The present invention relates to the monitoring and control of systems, in particular to the monitoring of the state of a system in response to an input.

Typically the monitoring of the state of a system, such as a mechanical, electrical, electronic system or combination thereof is achieved by including in the system sensors which are designed to measure and output the value of certain properties, such as operating parameters and variables of the system. The state of the system, and its response to inputs can then be seen in the output of the sensors. However, there are situations where the provision of sensors to monitor the system directly is disadvantageous. This is particularly true where the presence of the sensor can alter the system being monitored, or can degrade its performance, for instance by increasing the power consumption of the system, e.g. by requiring power itself, by introducing friction, or by disturbing the response of the system to an input. The presence of physical sensors also tends to add complexity to the system, and usually adds mass, and again there are situations where mass is critical and complexity needs to be reduced in order to increase the reliability of the system. Such a situation is, for instance, the provision of systems on orbital satellites. In that situation there is a general desire to reduce power consumption, to reduce mass and to reduce complexity, and so the provision of physical sensors on systems is undesirable.

An electro-mechanical example of such a system is found in the use of linear electric motors to drive valveless compressors, particularly for driving Stirling cycle coolers or pulse tube coolers, valved compressors, for instance domestic and industrial "Freon" type refrigerators, Gifford McMahon (GM) coolers and oil-free gas compressors, pumps in clean circulation systems, such as for medical purposes, or generators driven by Stirling engines. The linear electric motor is an example of a linear transducer, which combined with non-contacting bearings and seals, offers a number of advantages such as oil-free operation, which can eliminate problems associated with oil contamination, and wear-free operation, because the absence of contacting surfaces eliminates friction and thus maintenance is not required. Further, lifetimes and reliability can be very high. Linear motors can also be designed to have a very high efficiency, partly through the elimination of friction, but also because linear motors are capable of highly efficient part-load operation by varying the motor stroke at a constant frequency. This is not possible with rotary electric motors.

As mentioned above it is desirable to be able to monitor the state of the system, in this case the linear motor and compressor, and a particular problem in the use of such linear electro-mechanical transducers is the measurement and control of the stroke and offset of the transducer. By "offset" is meant the mean position of the moving part of the transducer. Thus, when such a transducer is in sinusoidal motion, its mean position is not easily defined or measured. In contrast, in a rotary machine the stroke and mean position are fixed by the geometry and physical connection of the drive mechanism, for instance the crank dimensions etc. In a linear electro-mechanical transducer, however, the stroke and offset are determined by the dynamics of the moving components, and generally show considerable variation with different operating conditions. This causes a number of problems. For instance, if the stroke and offset are not carefully controlled, damage can occur if the axial movement of the transducer exceeds the design range because it can result in unintended contact between different components of the system. Also, close control of the stroke and offset is needed to optimise machine efficiency, particularly at part load.

Currently the stroke and offset of a linear electro-mechanical transducer can be controlled by attaching a suitable displacement transducer to the moving part of the electro-mechanical transducer. Such a displacement transducer can, for instance, be based on the measurement of inductance changes caused by movement of an iron core within electrical coils in conjunction with the movement of the transducer being monitored. Capacitance-based monitors are also possible. However, such monitoring transducers, and their associated electronics add significantly to the size and cost of the device. The additional complexity also reduces reliability. Thus this is an example of a system in which it would be desirable to monitor the state of the system while avoiding direct measurement as far as possible.

U.S. Pat. No. 5,342,176 discloses a method of measuring the stroke of a compressor piston driven by a linear motor, on the basis of the voltage and current signals in the coils of the linear motor. With the valved system described in that patent the piston velocity is assumed to be proportional to the back EMF developed by the motor, and the piston stroke can be determined by integrating the piston velocity over time. The back EMF is deduced from the input voltage and current by assumptions based on a standard equivalent electrical circuit, including the motor inductance and resistance, both of which are assumed to be constant. It is also assumed that the force developed by the linear motor is proportional to the current in the motor, and is independent of position. However, the assumption that the force developed by the linear motor is directly proportional to the current, (the two being related by a constant known as the electro-mechanical transfer constant) is not correct for typical systems. Typically the electro-mechanical transfer constant depends on position. The described method for determining the average piston displacement also relies on having an expansion pressure for the piston that is equal to the fill pressure. That, also, is specific to the particular compressor design illustrated in the patent and is not generally applicable to other applications. It should also be said that if any of the system parameters of the compressor or linear motor vary, for example because of temperature variation or a fault condition, these cannot be taken into account and the measurements become less accurate or erroneous.

It is an object of the present invention to provide for the accurate monitoring and control of a system in an indirect way, and which reduces the need for sensors to measure the state of the system directly.

The present invention therefore provides a method and system for estimating the operating parameters and/or variables of a system which uses a parameterised model of the system and in which the model is fed with the same input as the system, the response of the model is compared with the response of the system, and the comparison is used to improve the parameters of the model. The values of the parameters and variables of the model can then be taken to be a good estimate of the values of the corresponding properties of the system itself. This technique can be incorporated into a feedback control loop, so that the input to the system is controlled on the basis of the model.

In more detail, the invention provides a method of monitoring the state of a system in response to an input to the system by providing an estimate of a value of at least one of a plurality of system properties including system variables and system parameters comprising the steps of:— providing a parametrised model of the system in which respective model parameters and variables correspond to said plurality of system properties, providing an input to said model corresponding to the value of an input to the system, measuring one of said system variables, comparing said measured one of said system variables with the corresponding model variable and outputting a measure of the difference between them, optimising the model to reduce said difference, generating a signal representative of an estimate of another one of said system properties based on the value of the model parameter or variable corresponding thereto.

The term "variable" is used here to mean properties of the system which can be measured such as current, voltage, position (and its derivatives), force, and functions of such variables and the corresponding values in the model. The term "parameter" is used to mean quantities which relate variables to each other, such as inductance, resistance, spring constants, the offset, and, in the embodiment below, the moving mass of the system. The distinction between variable and parameter, though, is to some extent arbitrary or dependent on the application and in general useful quantities will be functions of both variables and parameters.

The model may be optimised by iteratively comparing a measured system variable with the corresponding model variable and adjusting one or more of the model parameters, and determining from the optimised model an estimate of said at least one system property.

The optimisation need not continue until the agreement between the model and the system is maximum, but instead can continue for a preset number of iterations, or until the model and system are sufficiently close. The difference between them can be measured as the RMS difference or as the cross-correlation, and the optimisation process may proceed by a global optimisation algorithm which varies one or more of the model parameters.

In one embodiment of the invention the system comprises an electro-mechanical transducer, such as a linear motor, and the input may be the electrical voltage and the measured system variable be the electrical current in the transducer. However the motor may be driven by current input in which case the measured system variable is the electrical voltage, or alternatively the drive input may be the force, with the measured system variable being the voltage or current in the transducer. Linear motors can, of course, be used as generators and the invention is equally applicable to them.

Preferably the electro-mechanical transfer constant is a function of the transducer position. In one embodiment of the invention the transducer is designed specifically so that the electro-mechanical transfer constant varies with position in a known way.

The model parameters preferably comprise parameters describing the mechanical behaviour of the transducer, and its load, such as the moving mass, a damping coefficient, a spring rate coefficient, and the model variables include the offset representing the mean position of the transducer. The model also preferably includes the electrical characteristics of the transducer such as the effective circuit resistance, the effective circuit inductance and the effective circuit capacitance. The transducer may be driven with a repetitive or nearly repetitive waveform of known frequency, e.g. a sinusoidal waveform.

Where the transducer has a plurality of electrical circuits, the model may be based on separate circuit equivalents for each of the circuits, or the circuits may be lumped together as a single equivalent.

In a particular application of one embodiment of the invention, the transducer is a linear motor which is used to drive a compressor. Single compressor units are inherently unbalanced and thus generate vibration. To reduce the vibration an active balancer may be added to the system and the invention may fixer provide a way of calculating the control for the active balancer. In this case the motor analyser is used to determined the out of balance forces generated and a balancer model is used to calculate the required input to the balancer in order to balance the out of balance forces. The balancer model may be optimised in the same way as the transducer model mentioned above. Also, with balanced compressor pairs the invention can be used to adjust one of the compressor drives so as to attain better matching of compressor forces.

The invention also provides corresponding apparatus for monitoring and optionally for controlling, a system. Parts of the invention may be embodied in computer software and the invention extends to a computer program comprising program code means, and to a programmed computer system, for executing some or all of the steps of the invention.

BRIEF DESCRIPTION OF THE DRAWINGS

The invention will be further described by way of example, with reference to the accompanying drawings in which.

DETAILED DESCRIPTION OF EXAMPLE EMBODIMENTS

Figure 1:
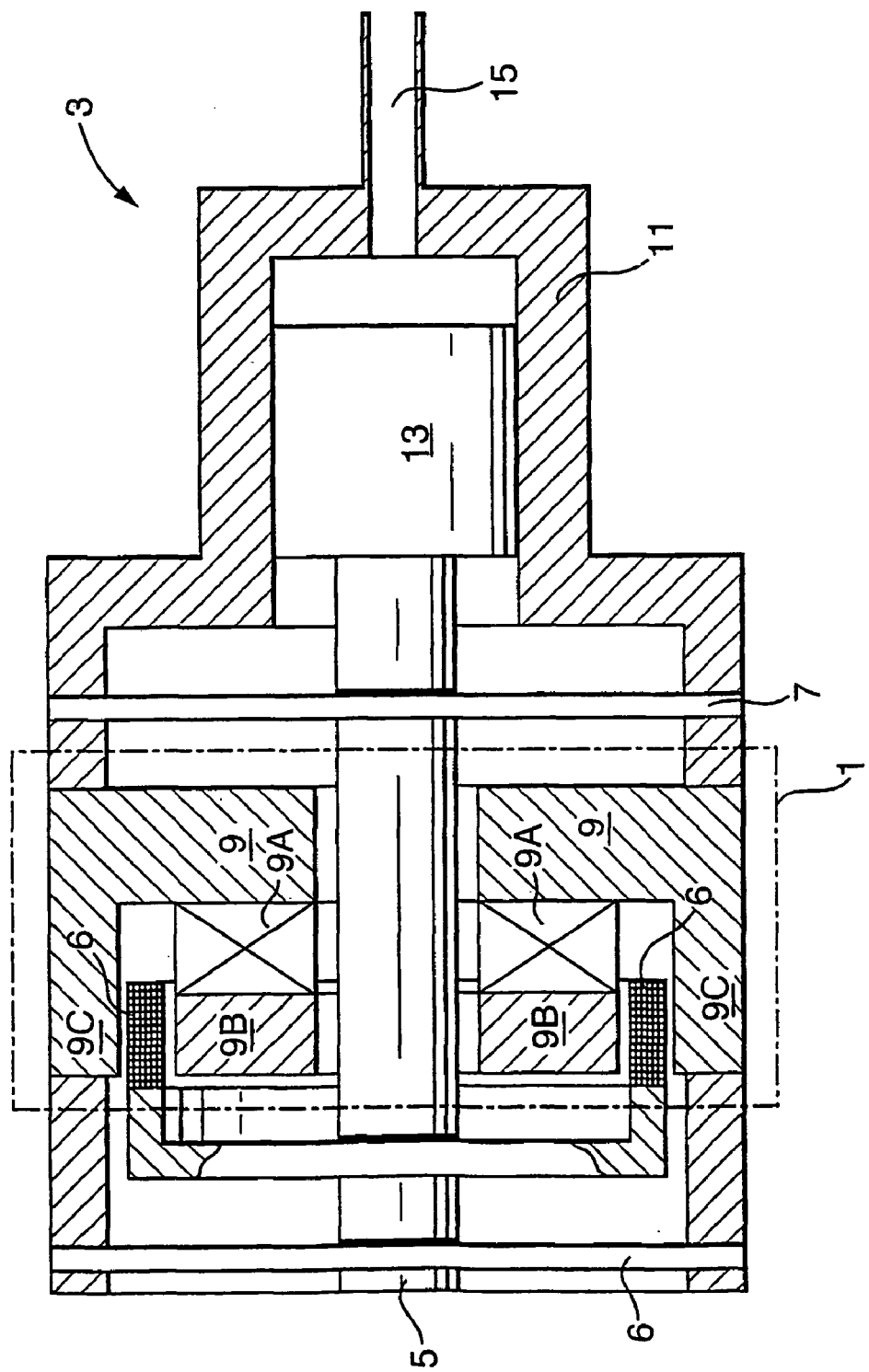
FIG. 1 is a schematic diagram showing a typical application of a linear motor to the drive of a compressor.
Figure 6:
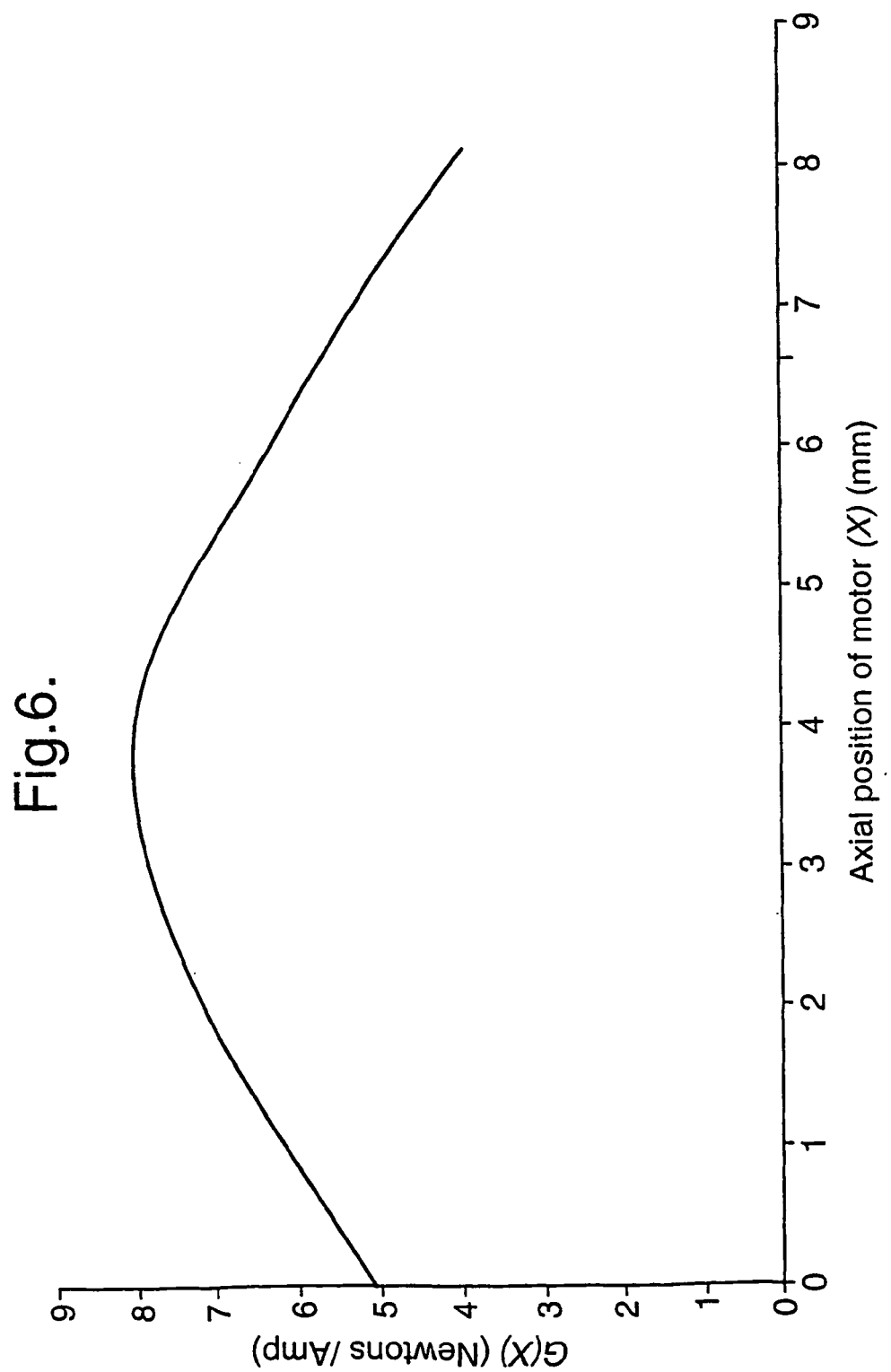
FIG. 6 illustrates the variation with position of the electro-mechanical transfer constant for a particular linear motor.

FIG. 1 illustrates a typical application of a linear motor to the drive of a compressor as might be used, for instance, in a Stirling cycle cooler for providing refrigeration in an orbital satellite. As is well known the linear motor 1 consists of a moving coil type armature 5 which is suspended on springs 7 and driven in linear motion by magnetic circuit 9 consisting of magnet 9A, inner pole piece 9B and outer pole piece 9C. The compressor 3 for the Stirling cycle cooler consists of a piston 13 which is connected to the armature 5 of the linear motor (which in this moving coil design carries a coil 6) and a cylinder 11 which has a compressor outlet 15. In use the linear motor is driven sinusoidally, normally by a sinusoidal voltage input from a voltage amplifier. However sometimes linear motors are current driven using a current amplifier. Typically in a linear motor, the electro-mechanical transfer constant, which gives the force produced per unit current in the coils, varies with the position of the armature. This variation can be termed the force characteristic, and a measured example is illustrated in FIG. 6. It can be seen that the force per unit current is higher when the armature is centrally positioned and decreases as it moves to each end. This variation is generally regarded as an undesirable feature because it means that a sinusoidal drive does not give a pure sinusoidal motor force, but one with harmonics.

Figure 2:
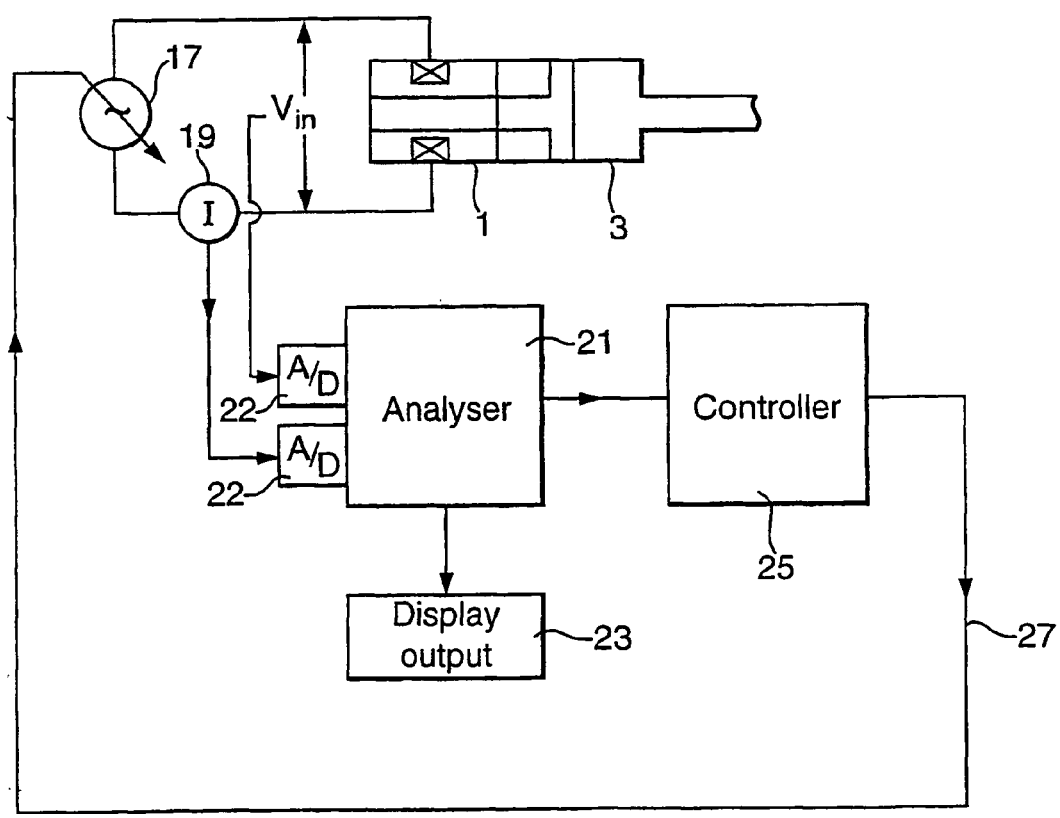
FIG. 2 schematically shows an embodiment of the invention in use with the linear motor application of FIG. 1.

FIG. 2 illustrates schematically an embodiment of the invention. As illustrated the linear motor 1 (which drives compressor 3) is energised by a sinusoidal input voltage $V_{IN}$ produced by a voltage amplifier 17. In accordance with this embodiment of the invention the values of input voltage $V_{IN}$ are also supplied as an input to an analyser 21 together with a measurement of the current I in the linear motor supplied by current sensor 19, e.g. by measuring the voltage drop across a reference resistor. The analyser 21 will be described below. It produces, and can display on output display 23, estimates of the properties of the linear compressor system. These estimates may optionally be used by a linear motor controller 25 provided in an optional feedback loop 27 for controlling the drive voltage applied to the linear motor.

Figure 7:
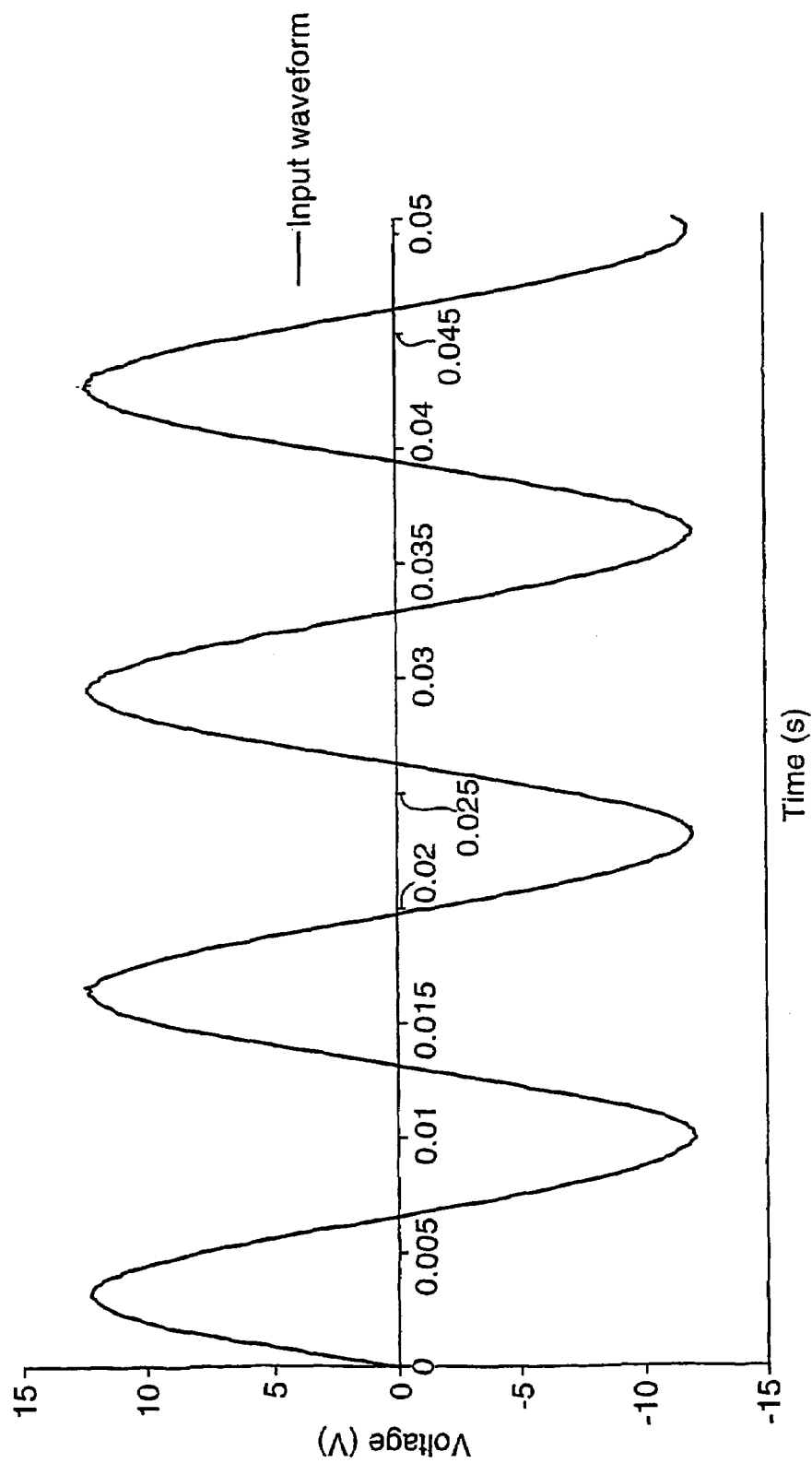
FIG. 7 illustrates the measured input voltage from a particular application of a linear motor.

FIG. 7 illustrates a typical measured drive voltage for a linear motor used to drive a Stirling cycle cooler at a typical running frequency of 60 Hz. For use in the analyser the input voltage and measured current are digitised using A/D convertors 22 running at, for example 50 KHz.

Figure 3:
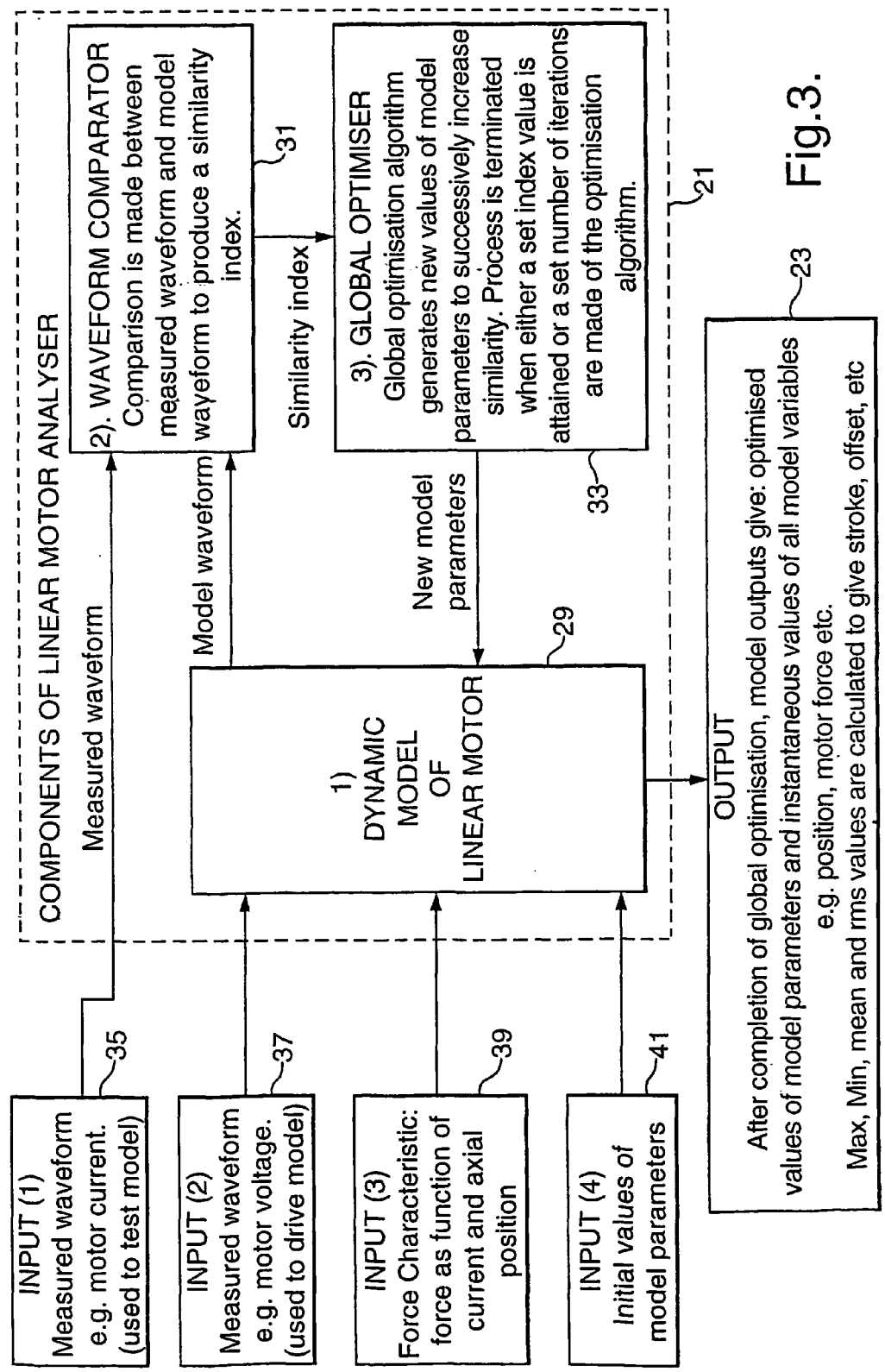
FIG. 3 schematically illustrates the analyser in the embodiment of FIG. 2.

FIG. 3 is a flow diagram illustrating the analyser 21 and its output 23. The analyser 21 consists of a dynamic model 29 of the linear motor which is used to predict the current in the linear motor based on the input voltage, a waveform comparator 31 for comparing the predicted current and the measured current, and a global optimiser 33 for generating new values of the model parameters to improve the current estimate. The model 29 has three inputs: a sampled waveform 37 representing the drive of the linear motor, for instance the motor input voltage; a force characteristic 39 for the linear motor used, which may be look-up tables or equations that give motor force as a function of axial position and motor current; and a set of initial values 41 of the model parameters. These parameters define the operating characteristics of the linear motor with its load. The values will be updated by the optimiser 33 and so the initial values do not necessarily need to be close to the optimised values. In practice, however, it is possible to anticipate the values quite closely. The details of the model will be discussed in more detail below, but basically the model performs several cycles and generates an output waveform, which in this embodiment is a prediction for the current in the linear motor. The number of cycles required is determined by the time taken for the model to settle to a steady state but, in this embodiment, is typically five. The output waveform of the model is provided to a waveform comparator 31 which compares it with the input measured waveform 35. The comparator uses an index which quantifies the degree of match between the two waveforms. Preferably the comparison is made on the last complete cycle of motion of the linear motor model to minimise the effect of transients produced when the model starts running. The details of the waveform comparator will be explained further below. The output of the waveform comparator, namely the index giving the match between the two waveforms is provided to a global optimiser 33 which uses an optimisation algorithm (which may be one of the many known ones) to adjust one or more of the model parameters so as to improve the match—i.e. to improve the similarity of the model to the linear motor so that the predicted current correlates better with the measured current. This optimisation process is repeated to improve the parameters, either until a set level of similarity between the two waveforms is attained, or until a set number of iterations have been completed by the optimisation algorithm. Of course in theory it would be possible to continue until the similarity does not improve, but in practice an answer needs to be given by the analyser in a predetermined amount of time, so continuing until there is a set level of similarity or through a set number of iterations is preferable.

After optimisation (to the desired level) of the model, the instantaneous values of the model parameters are used to calculate all of the quantities required for monitoring or control of the linear motor. Some such as the offset (namely the mean axial position of the armature) can be read directly from the model. Others, such as the motor force, need to be calculated from the values of the model parameters and variables and these can be displayed or used in the control of the motor.

Dynamic Motor Model

A) Equation of Motion

Figure 4:
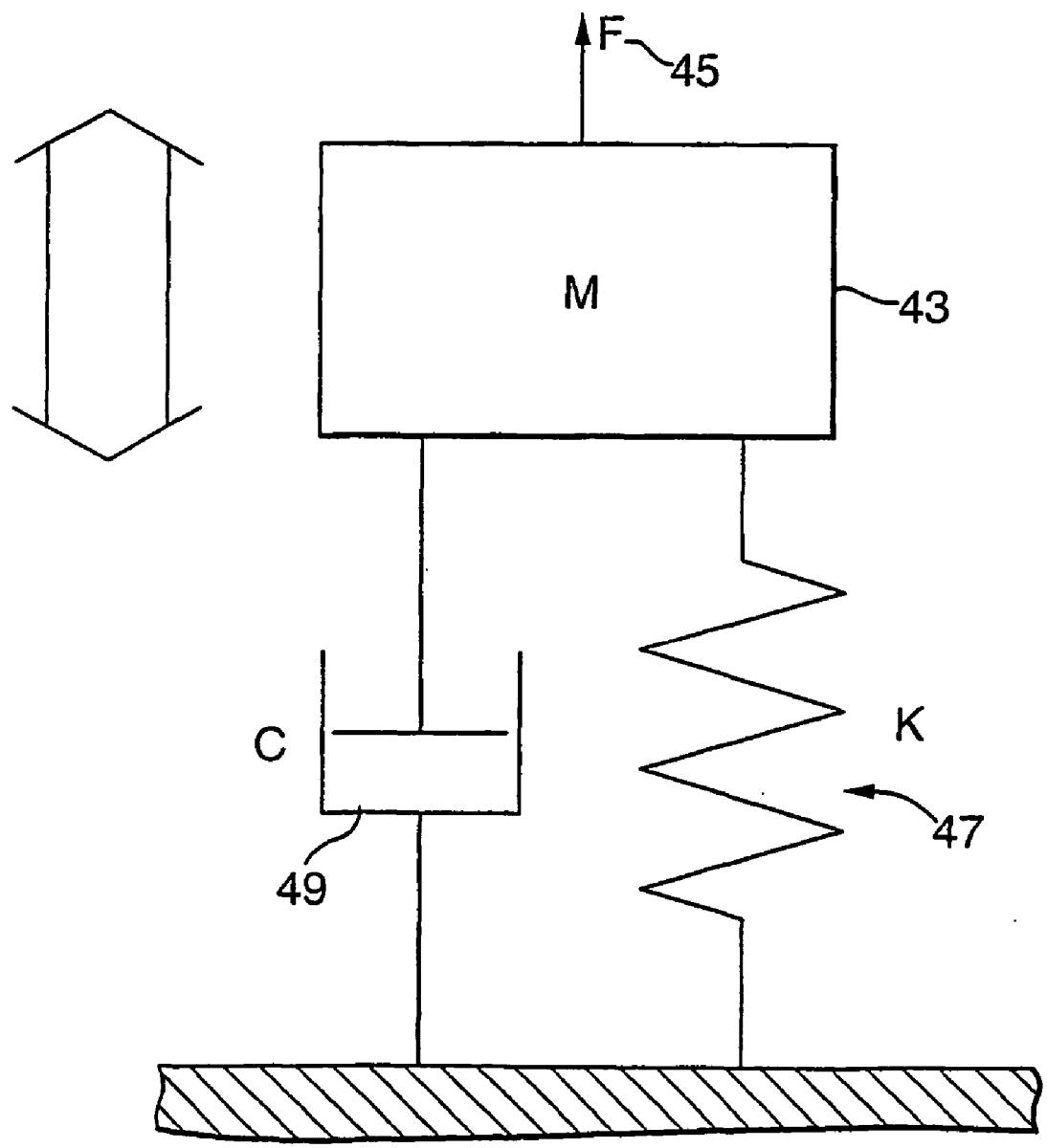
FIG. 4 schematically illustrates the mechanical model used as a basis for the model of the linear motor.

The basic equation of motion used in the linear motor model is that for a damped harmonic oscillator with a driving force F (see schematic illustration in FIG. 4):

$$m\frac{d^2x}{dt^2} + c\frac{dx}{dt} + kx = F$$

x is the axial displacement of the moving component from its neutral position.

For an ideal damped harmonic oscillator m, c and k are constants:

m is the total moving mass (43)

c is the damping coefficient (49)

k is the spring rate (47) and

F is the force (45) generated by linear motor.

The behaviour of a real reciprocating machine departs significantly from this simple model and to develop an accurate model, c and k are allowed to be functions of any of the motor variables:

$$c\left(x, \frac{dx}{dt}, i \ldots\right)$$

the damping function, represents the load that the motor is driving but may include losses associated with the motor itself.

$$k\left(x, \frac{dx}{dt}, i \ldots\right)$$

the spring rate function, represents the total effective spring rate. This may include spring components contributed by the load as well as the components inherent in the motor assembly c and k may be functions of other parameters, such as the operating temperature. The modified equation of motion becomes:

$$m\frac{d^2 x}{dt^2} + c\left(x, \frac{dx}{dt}, i \ldots\right)\frac{dx}{dt} + k\left(x, \frac{dx}{dt}, i \ldots\right)x = F \quad (1)$$

B) Determination of Mean Displacement/Offset

The equation of motion will result in oscillatory behaviour about a mean point known as the offset. This point cannot in general be specified in a linear motor application such as this because the spring contribution made by the load itself may have an ill defined zero point. For example, in a gas compressor, the equilibrium zero point is determined by the effect of seal leakage and is subject to variations in seal geometry, gas densities etc. The determination of the mean motor position (and hence the offset from the resting position), is important for two reasons:

firstly the compressor cannot be accurately modelled without this information given that the motor force characteristic is almost always a function of position;

secondly, it is an important control quantity (e.g. to avoid pistons hitting cylinder heads etc.).

The approach adopted in this invention is to use the motor force characteristic, which is an absolute positional reference, to determine the mean motor position. This is achieved by varying the offset of the force/position characteristic within the optimisation procedure. It has been found that for typical motor designs the optimisation is sensitive to the offset value and accurate values are readily determined. In terms of the equation of motion the force F now becomes F(X, . . . ) Where $X = x + x_0$ and $x_0$ is the offset value.

C) Electrical Circuit

Figure 5:
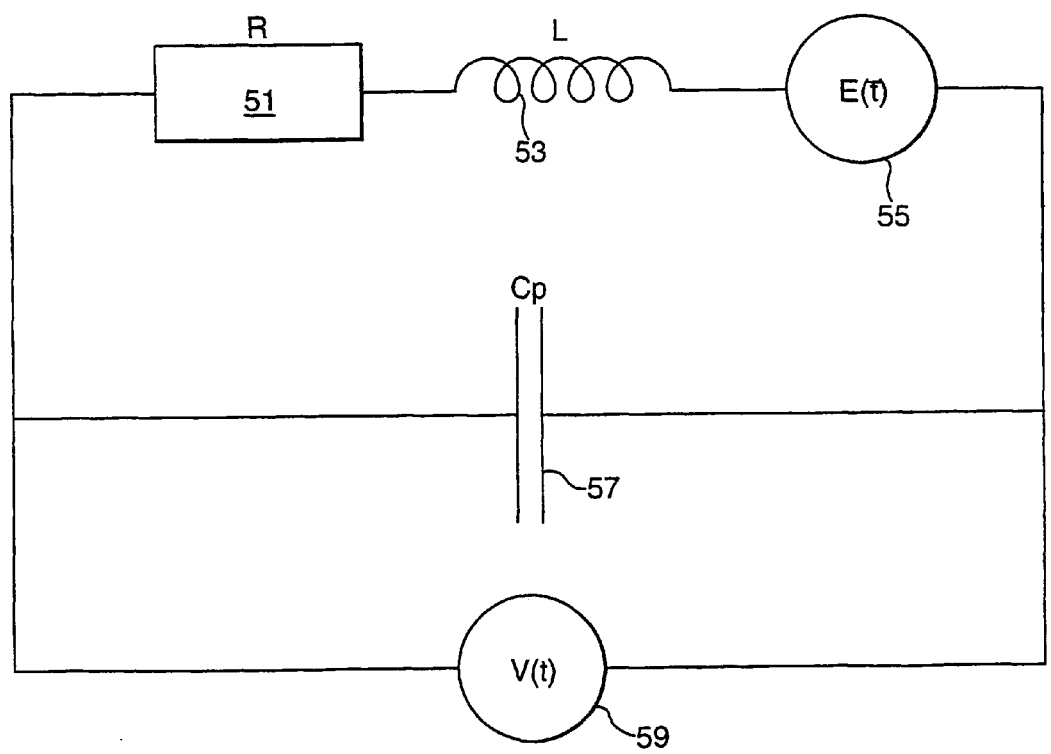
FIG. 5 schematically illustrates the electrical circuit equivalent of the linear motor.

FIG. 5 illustrates an electrical circuit equivalent for the linear motor as used in the model. If capacitance effects are ignored for a moment, the electrical circuit for an electromagnetic linear motor can generally be represented by:

$$V(t) = -\frac{d\psi}{dt} + R \cdot i(t)$$

Where $\psi$ is the flux linkage for the motor circuit, V(t) is the applied voltage (59), i(t) is the motor current and R is the effective resistance (51). The instantaneous electrical energy input to the motor is given by V(t).i(t).dt and this has to be balanced by three energy components in the motor:

work done;

changes in magnetic energy;

resistive losses.

The resistive losses are readily identified with the R.i(t) term. The dψ/dt term must therefore contain both the mechanical work done and any changes in magnetic energy. The variation of magnetic energy can be expressed by L.di/dt where L is the circuit inductance (53), hence a general electrical circuit becomes:

$$V(t) = E(t) + L\left(x, \frac{dx}{dt}, i \ldots\right)\frac{di}{dt} + R\left(x, \frac{dx}{dt}, i \ldots\right) \cdot i(t) \quad (2)$$

Where E(t) is the emf (55) associated with the work done by the motor. The resistance and inductance include the components due to the coil resistance and inductance but may also include components due to eddy currents, etc. They are often found to be constant but they can also be allowed to be functions of any of the motor variables and parameters if this is required, such as the displacement, velocity, current, temperature etc.

For the model E(t) can be obtained by considering the instantaneous power P(t) developed:

$$P(t) = E(t) \cdot i(t) = F \cdot \frac{dx}{dt} \quad (3)$$

Hence $$E(t) = \frac{F\frac{dx}{dt}}{i(t)}$$

The mechanism by which flux linkage is varied to generate E(t) varies with different motor designs but this does not alter the general approach. As long as the force characteristic is known then E(t) can be calculated using the above.

In high frequency applications or where very high accuracy is required it may be necessary to account for a winding capacitance associated with the motor circuit. This can generally be represented by a single lumped capacitance Cp (57) in parallel with the main motor circuit as shown in FIG. 5. The effect of this capacitance is to draw an additional current given by:

$$i_c = Cp \cdot \frac{dV(t)}{dt}$$

Equations 1 to 3 form a general definition of a model that can be applied to virtually any reciprocating linear motor operating in a quasi-steady state. To arrive at a model for a particular combination of linear motor design and operating conditions, certain inputs need to be specified, which will be explained below.

D) Model Inputs i) The parameters required to define the mechanical behaviour of the motor. These are:

moving mass m, the coefficients of the damping function $$c\left(x, \frac{dx}{dt}, i \ldots\right)$$

the coefficients of the spring rate function $$k\left(x, \frac{dx}{dt}, i \ldots\right)$$

ii) The parameters required to define the electrical behaviour of the motor. These are:

the coefficients of the effective circuit resistance $$R\left(x, \frac{dx}{dt}, i \ldots\right)$$

the coefficients of the effective circuit inductance $$L\left(x, \frac{dx}{dt}, i \ldots\right)$$

The initial values for all these parameters do not need to be known precisely because the optimisation process will adjust them to improve the model fit. However, it is desirable to fix at least one parameter otherwise there may not be a well-defined optimum for the optimiser to find. In practice it has been found that the moving mass in the linear motor/compressor can be measured accurately enough for its value to be fixed.

The precise functional dependence of c, k, R and L do not need to be known. It has been found that functions that are accurate enough over limited operating conditions can be determined empirically by trying typical functions, exemplified below, and observing the level of correlation obtained.

iii) A force characteristic for the linear motor.

This is required so that the model can calculate F as a function of other variables. It can be either in the form of a look up table or a set of equations. Typically the force characteristic can be expressed as a function of current and position. With some designs e.g. induction motor designs, the force characteristic is complicated by having an additional dependence on the motor velocity. For others the force is linearly dependent on current so that only a functional dependence on position is required:

i.e. $F(i,X)=i.G(X)$ where $X=x+x_0$

The force characteristic can be calculated from detailed modelling of the electromagnetic design of the linear motor or from actual measurements on the linear motor. For motor designs where the force is only dependent on position and current, accurate static measurements can easily be made and this is the preferred option. An example of a force characteristic measured for a linear motor is given in FIG. 6.

If current excited field coils are used rather than permanent magnets in the motor, the force will be a function of the excitation current too. In this case the excitation current can be treated as another property which can be estimated from the model.

iv) A time varying input to drive the model.

In principle any model variable can be selected as the independent variable and defined as a time varying input e.g. voltage, current, motor force. For the purposes of analysing an operating linear motor where the measured values are conveniently the current and voltage waveforms the choice lies between these two. In most instances linear motors are driven by a voltage amplifier and it is appropriate to let the voltage input be the driving waveform and the current waveform the output to be matched. Where a linear motor is driven by a current amplifier this can be reversed.

E) Implementation of Model

The model equations and inputs, described above, are implemented on a computer software platform using conventional numerical techniques to arrive at a solution.

Waveform Comparator

The output of the model is waveform for a number of complete oscillations of the motor. If the input to the model is a voltage waveform then the output is a current waveform and vice versa. In the waveform comparator 31, the output waveform is compared with the corresponding measured waveform to assess how closely the model is replicating the actual behaviour of the motor. The result is a value that quantifies the degree of correspondence. In this embodiment the two waveforms are compared at about 1000-2000 points per cycle.

The comparison is made for the last complete cycle of the model to minimise the effects of transients produced when the model starts.

It is important that the correct phase is maintained between the two measured waveforms for the best results to be obtained. Errors in phase are unlikely to occur at the sampling stage but they may be introduced if the signals are filtered to reduce noise.

Various algorithms for calculating the similarity can be defined but two that have been used are:

a) Cross correlation—This is a standard statistical tool for measuring the degree of correlation (and hence similarity) between two data streams. The correlation coefficient can lie between 0 and 1 and improving the match corresponds to increasing the correlation coefficient. A value of 1 implies perfect correlation i.e. the waveforms are identical.

b) RMS Error—This is defined as follows:

$$\text{RMS Error} = \left( \frac{\int (Y_{meas}(t) - Y_{mod}(t))^2 dt}{\int (Y_{meas}(t))^2 dt} \right)^{1/2}$$

Where $Y_{meas}(t)$ is the measured waveform value and $Y_{mod}(t)$ is the model waveform value. In this instance improving the match corresponds to decreasing the RMS Error. A value of 0 implies that the waveforms are identical.

Global Optimiser

The output of the waveform comparator 31 is a "similarity value" that quantifies the level of correspondence between the measured waveform and the model waveform. The global optimiser 33 adjusts one or more of the model parameters according to a particular algorithm and reruns the model 29 with the same voltage waveform input. The new similarity value is calculated and compared with previous values. The optimiser 33 continues to adjust model parameters in such a way as to increase the "similarity value"—i.e. the optimiser 33 seeks to continually improve the match between the two waveforms. This process could continue until the match is as close as it can be and further iterations do not produce any improvement, the limit being determined by accuracy of the model and the model inputs. For a practical measurement system the time taken needs to be limited and optimisation process will be terminated when either a set "similarity value" is attained or a set number of iterations of the optimiser 33 have been performed.

The optimiser algorithm used is chosen according to the use of the invention. For example where the invention is being used as a diagnostic tool in the development of a new linear compressor, the optimiser can be chosen to be wide ranging in both the number of parameters it changes and the values that it tries. Although this optimiser might be relatively slow, it would allow optimum model values to be found starting with only approximate initial values.

In a different example where the invention is being used to control a well-characterised compressor operating over a very limited range, the optimiser can be faster as it is likely to make only small adjustments to a few parameters to find optimum model values.

If too many parameters are fixed then the model is over-constrained and a satisfactory optimum may not be achieved. If insufficient parameters are fixed then the optimisation process can result in differing sets of values depending on the starting point. Combinations of fixed and optimised parameters that will lead to a well-defined optimisation can be judged from knowledge of the system or can be determined by trial and error.

It follows that ideally the optimiser algorithm should be tailored to the individual application so that it only tries sensible values and optimises quickly.

EXAMPLE

A specific example illustrating the application of the invention to a moving coil linear motor driving a Stirling cycle cooler (in this case a Hymatic 250 mW Integral Stirling Cycle Cooler—design input power 6 W) will be given below. The equation of motion that has been found to give an accurate model for the particular cooler mentioned above operating at normal design conditions is:

$$m\frac{d^2x}{dt^2} + c(x)\frac{dx}{dt} + kx = F(X, i) = i(t) \cdot G(X)$$

Where:
m is the moving mass
c(x) is a damping coefficient function c(x)=a+b.x.
k is the spring rate (found to be constant)
G(X) represents the dependence of coil force on position
X=x+$x_0$ where $x_0$ is the offset that allows the axial position to be adjusted to give the best model fit.

G(X) was measured experimentally and is the one shown in graphical form in FIG. 6.

The equation:

$$V(t) + V_{dc} = E(t) + R \cdot i(t) + L \cdot \frac{di}{dt}$$

represents the electrical behaviour adequately with R and L treated as constants. E(t) can be calculated from the force dependence as follows:

$$E(t) = \frac{F \cdot \frac{dx}{dt}}{i(t)} = G(X) \cdot \frac{dx}{dt}$$

V(t) is the sampled waveform input. $V_{dc}$ is an additional parameter introduced to account for errors that might be present in the dc level of the sampled waveform. $V_{dc}$ is typically small but accounting for it can make a significant improvement in the level of correlation.

The sampled repetitive waveform V(t) can be a file containing voltage values paired with time values. Alternatively the input can be reformulated to give voltage values at successive phase angles for a just one cycle. If this is done, as was the case in this example, then the frequency of operation (f) needs to be given for the model to have complete information.

The complete list of model parameters for this example is:
m, f, $x_0$, a, b, k, R, L, Vdc The frequency (f) is fixed and the mass (m) can be determined with sufficient accuracy at the outset so these values are not varied in the global optimisation process. For the other seven parameters, the initial values need only to be close enough for the chosen optimisation algorithm to function.

For this example the platform used to implement the model, waveform comparison and optimisation was a proprietary dynamic modelling program called VisSim. The equations were formulated for the model to accept a voltage waveform input. The measured voltage waveform used to drive the model is shown in FIG. 7. It is basically a sinusoidal waveform but may contain noise and small levels of higher harmonics.

The optimum parameters values were found by using the Powell Method which is provided as one of VisSim's own global optimisation options. The waveform comparator algorithm used was the RMS error value described above. The actual cost function (as defined in the VisSim optimiser) used was the (RMS error)$^2$.

Figure 8:
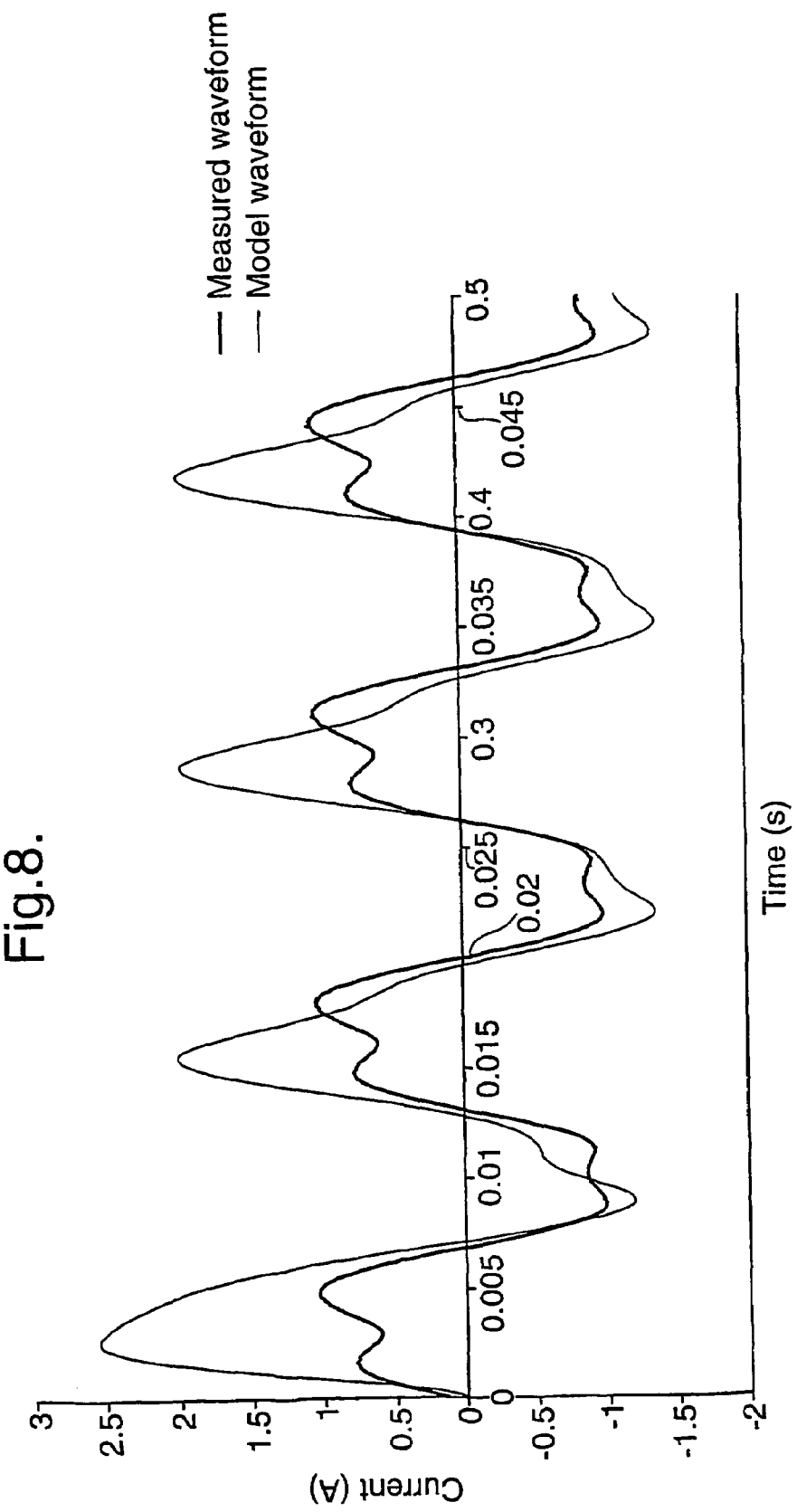
FIG. 8 illustrates an initial comparison between the measured current in a linear motor and predicted current derived from a model before optimisation in a particular application of the linear motor.
Figure 9:
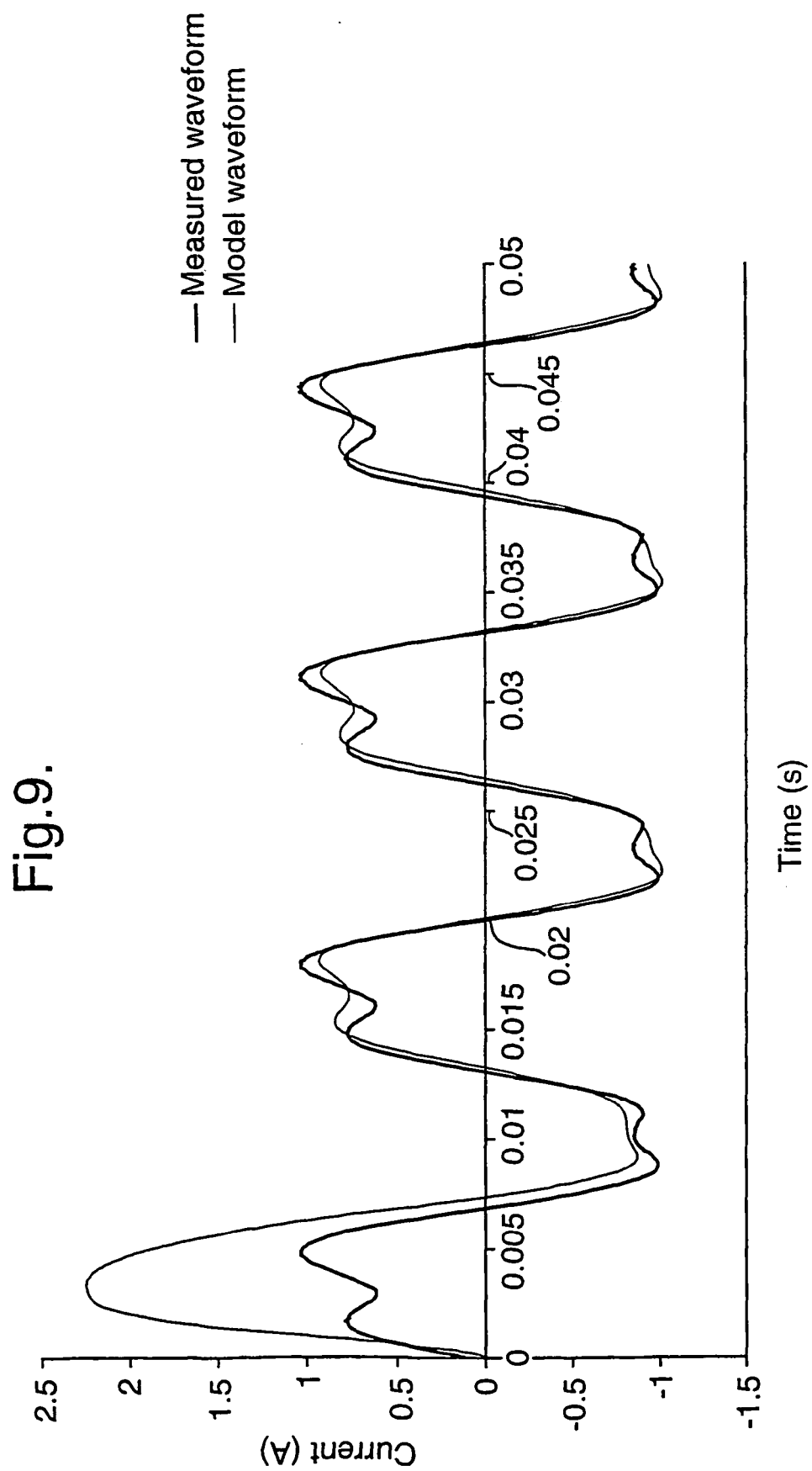
FIG. 9 illustrates the comparison between the measured current and predicted current part-way through optimisation.
Figure 10:
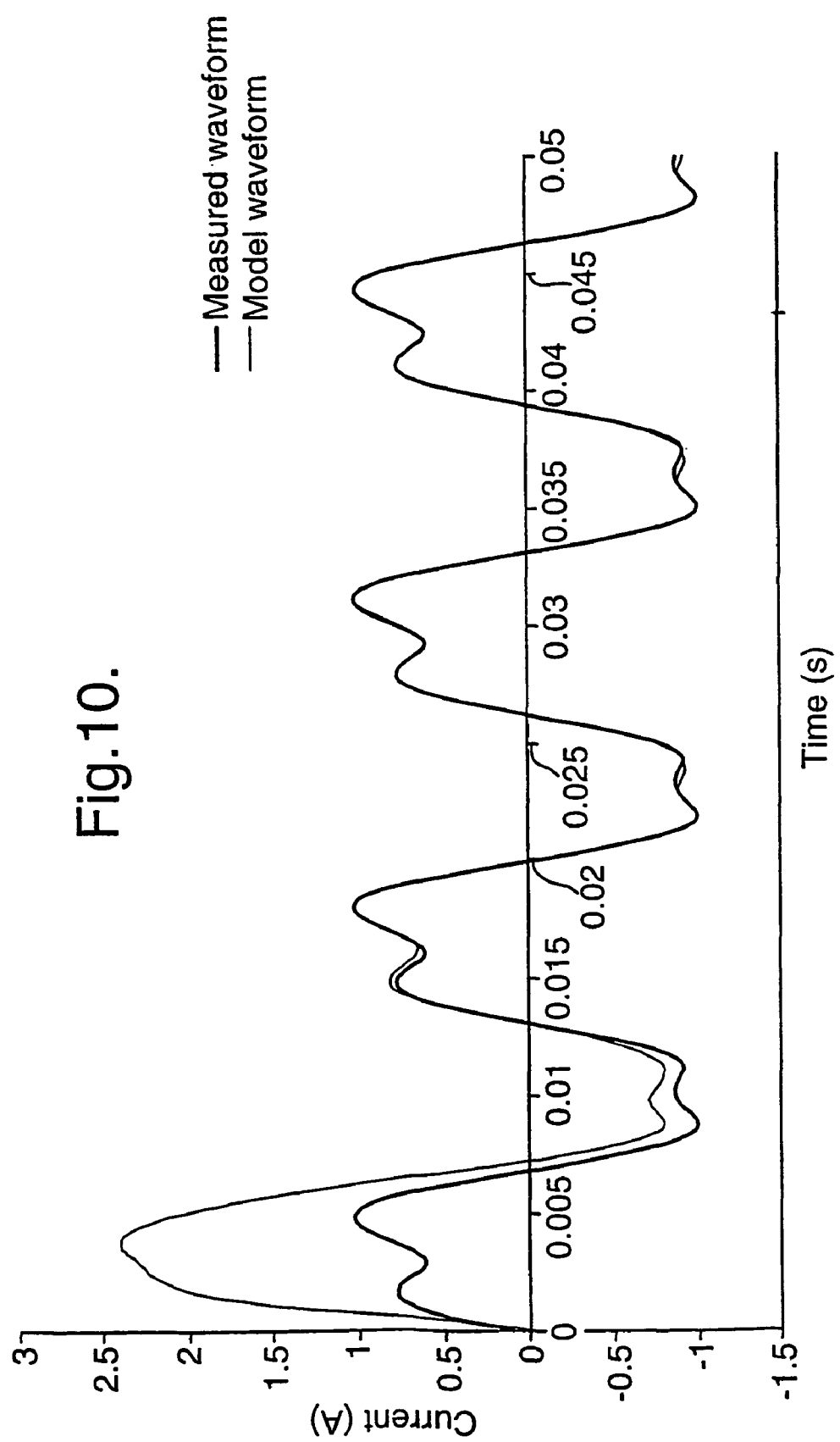
FIG. 10 illustrates the comparison between the measured current and predicted current at the end of optimisation.

The table below shows how the values of the parameters change as the optimisation progresses. The corresponding matches between the model waveforms and the measured waveforms are shown in FIGS. 8 to 10. Also included in the table are RMS error values and the calculated strokes.

It can be clearly seen that the model starts off with a very large error but optimises to give good accuracy—the rms error being around 3%. Clearly the full accuracy obtained is limited by the both accuracy of the input and the model.

| PARAMETER | INITIAL VALUES | INTERIM VALUES | OPTIMISED VALUES |
|---|---|---|---|
| Moving Mass m(g) | 28 | 28 | 28 |
| Frequency (Hz) | 76 | 76 | 76 |
| Offset (mm) | 3 | 3.538 | 3.529 |
| a (N · s/m) | 8 | 6.166 | 5.738 |
| b (N · s/m$^2$) | 0 | 858.7 | 958.6 |
| k (N/m) | 5000 | 6607 | 6519 |
| R (ohms) | 2 | 2.618 | 2.362 |
| L (Henrys) | 1.5e-3 | 1.5e-3 | 7.699e-4 |
| Vdc (Volts) | 0 | −0.0802 | −0.0345 |
| Stroke (mm) | 5.398 | 5.188 | 5.437 |
| (RMS Error)$^2$ | 0.4983 | 1.7089e-2 | 9.80925e-4 |
| RMS Error | 0.7059 | 0.1307 | 0.0313 |

The example above is for a valve-less compressor where the spring rate and damping coefficients are simple continuous functions. However the approach can still be used in applications where some of the parameters may need to be represented by discontinuous functions.

For example in a valved compressor the opening and closing of the valves will be decided by cylinder pressure and will cause step changes in the spring rate. The cylinder pressure P can be evaluated in the model from the balance of forces. The spring rate variation might therefore be described by:

$$k\left(x, \frac{dx}{dt}, i \ldots\right) = k_1\left(x, \frac{dx}{dt}, i \ldots\right)$$

for $P_1 < P < P_2$ piston approaching TDC $$k\left(x, \frac{dx}{dt}, i \ldots\right) = k_2\left(x, \frac{dx}{dt}, i \ldots\right)$$

for $P = P_2$ piston approaching TDC $$k\left(x, \frac{dx}{dt}, i \ldots\right) = k_3\left(x, \frac{dx}{dt}, i \ldots\right)$$

for $P_1 < P < P_2$ piston approaching BDC $$k\left(x, \frac{dx}{dt}, i \ldots\right) = k_4\left(x, \frac{dx}{dt}, i \ldots\right)$$

for $P_1 = P$ piston approaching BDC

Where $P_1$ is the suction pressure, $P_2$ is the delivery pressure and TDC and BDC are top and bottom dead centre respectively.

Step changes in other parameters, e.g. damping coefficient c, can be dealt with in a similar way.

Also, a common loss mechanism which can occur in a number of applications is a hysteresis loss. This can be treated as a combination of varying spring and damping coefficients.

The description above has been limited to motors having a single electrical circuit. There are instances where the motor force is the sum of component forces generated by a number of electrical circuits i.e.

$$F = F_1 + F_2 + \ldots + F_n \text{ etc}$$

where $F_1, F_2 \ldots F_n$ are the forces associated with electrical circuits 1 to n.

These force characteristics can be determined by detailed modelling or by measurement (This can be done by energising one circuit at a time).

The force characteristic can then be used to calculate the motor emfs using:

$$E_n(t) = \frac{F_n \frac{dx}{dt}}{i_n(t)}$$

The complete set of equations constituting the model is:

$$m\frac{d^2x}{dt^2} + c\left(x, \frac{dx}{dt}, i \ldots\right)\frac{dx}{dt} + k\left(x, \frac{dx}{dt}, i \ldots\right)x = F$$

$$V_1(t) = E_1(t) + L_1\left(x, \frac{dx}{dt}, i_1\right)\frac{di_1}{dt} + R_1\left(x, \frac{dx}{dt}, i_1\right) \cdot i_1(t)$$

to $$V_n(t) = E_n(t) + L_n\left(x, \frac{dx}{dt}, i_n\right)\frac{di_n}{dt} + R_n\left(x, \frac{dx}{dt}, i_n\right)i_n(t)$$

These equations can be solved and the parameters optimised using the same approach as for the a single circuit. For each circuit there is a set of voltage and current waveforms and the optimisation maximises the correlation between model and measured values for all the output waveforms.

It is clear that the computation required will increase as the number of circuits increases the model complexity. It is often possible to avoid this by lumping the circuits together and modelling a single equivalent circuit.

Figure 11:
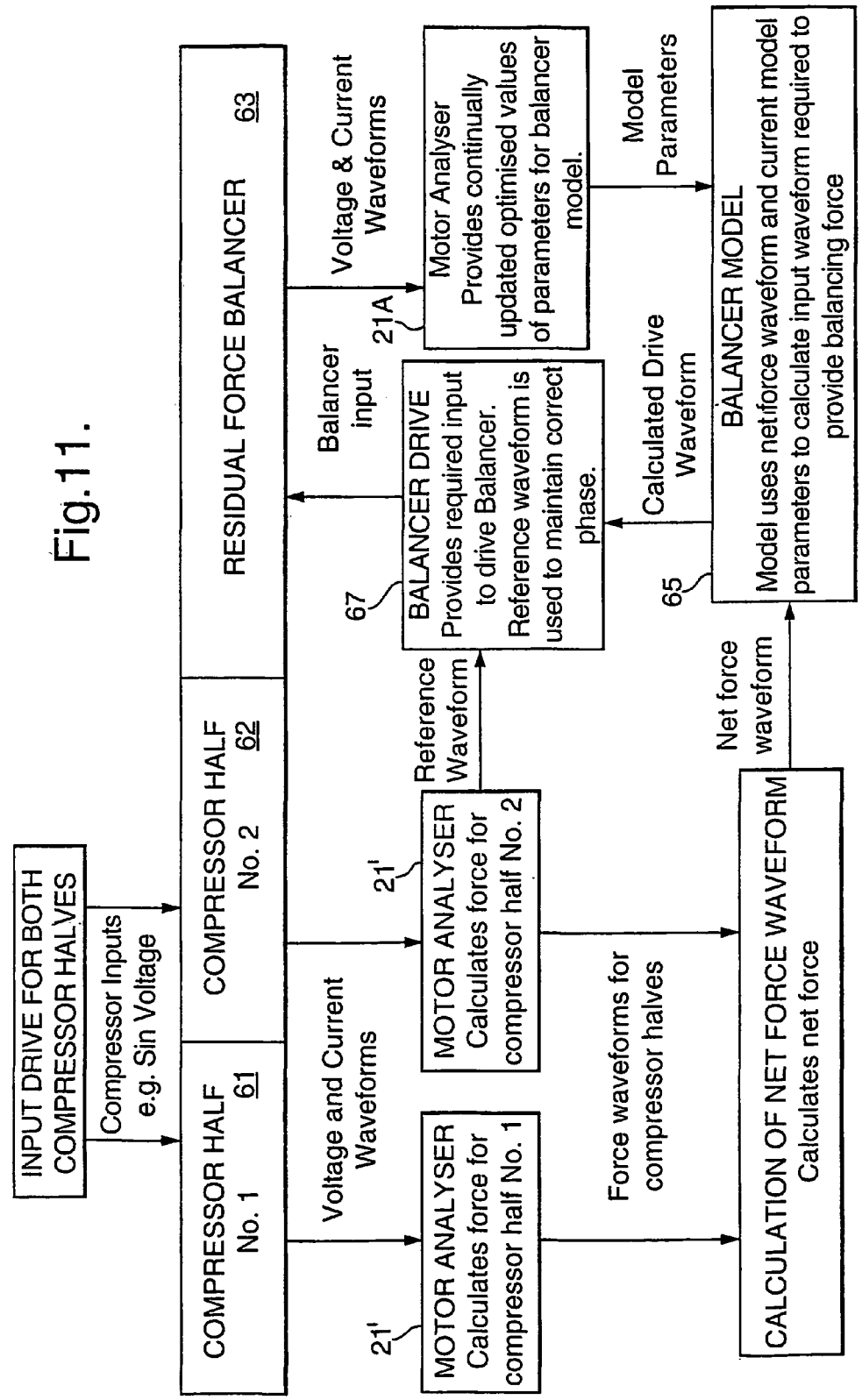
FIG. 11 schematically illustrates a further embodiment of the invention in which two linear motors are used to drive a balanced compressor pair and a residual force balancer is used.
Figure 12:
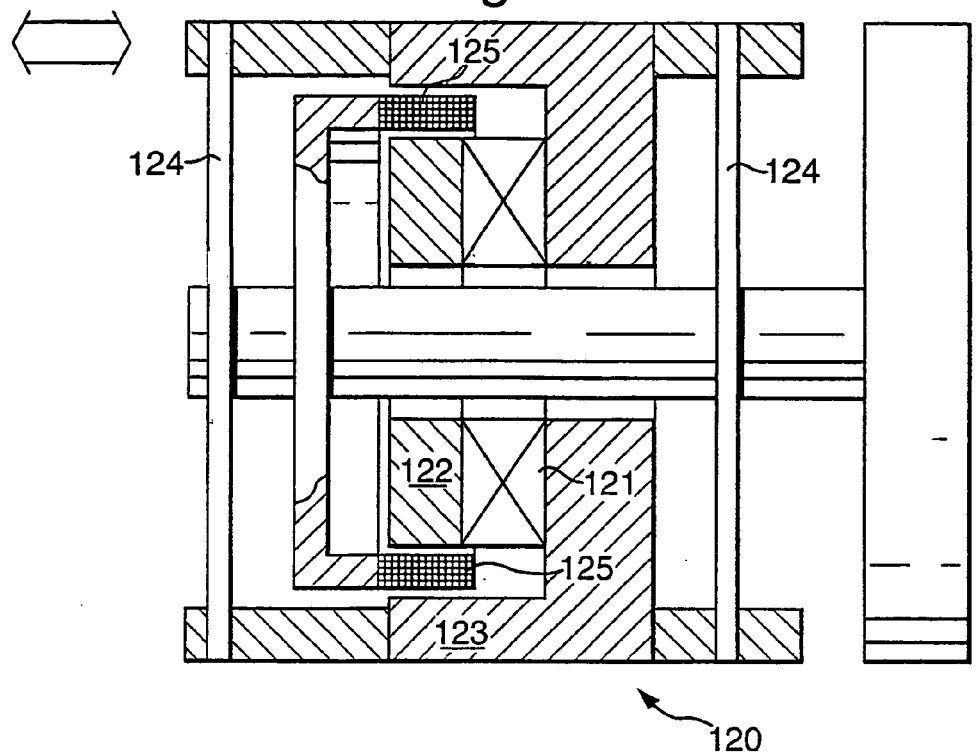
FIG. 12 schematically illustrates an active balancer.
Figure 13:
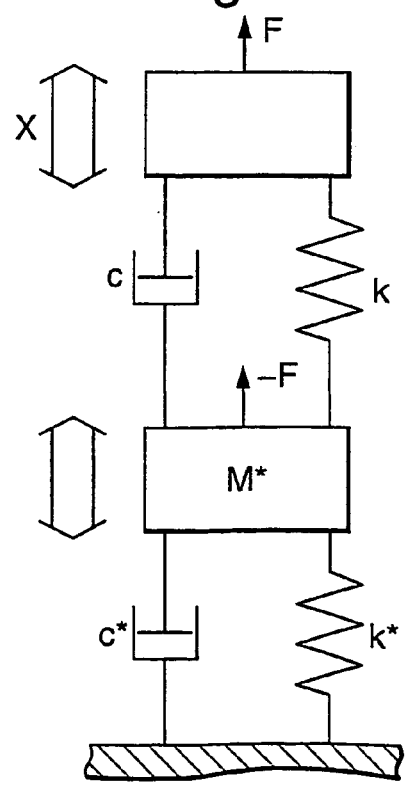
FIG. 13 schematically illustrates a compressor unit on a vibration isolating mounting.

Single linear compressor units are inherently unbalanced and the vibration generated is unacceptable for some applications. FIGS. 11, 12 and 13 illustrate aspects of various solutions to this problem which may be used together, or individually.

The most basic and common approach is that in order to minimise vibration transmission to components and to reduce noise etc the compressor unit is usually mounted on vibration isolating components e.g. rubber feet. The model described above itself is readily extended to include the behaviour of the mounting components as described below.

Mounting components used for the purpose of vibration isolation vary considerably in their construction but can generally be treated as a combined spring damper. A system including a compressor and it mountings can be modelled as shown in FIG. 13. This system can be described as an assembly containing two coupled damped harmonic oscillators. The equations of motions are:

$$m\frac{d^2x}{dt^2} + c\frac{d(x-y)}{dt} + k(x-y) = F$$

and $$m*\frac{d^2y}{dt^2} + c\frac{d(y-x)}{dt} + k(y-x) + c*\frac{dy}{dt} + k*y = -F$$

where m, c, k and x are as defined for the simpler model described previously m* is the mass of the compressor body and its mounting components, c* and k* are damping and spring values for the mounting components. y is the displacement of the compressor body.

This model can be optimised in the same way as the simpler model above providing some parameter values are fixed so that there are sufficient constraints for the optimisation process to work. In this instance the values of m*, c* and k* need to be determined in addition to m. this is not a problem as m*, c* and k* are readily measured. Also it has been found that for typical values of m and m*, where m*/m>10, the model is not sensitive to their values and accurate values are not generally required.

A more complex approach is to use balanced compressor pairs in which a pair of linear motor/compressor combinations are run back-to-back. This is schematically illustrated in the left-hand half of FIG. 11 at 61, 62 and will be discussed further below. A balanced compressor pair (consisting of compressors 61, 62) gives good balance but is significantly more expensive. An alternative or additional approach which is economically more attractive is to use a single compressor unit together with an active balancer as shown in FIG. 12 consisting of a linear motor driving a mass. As illustrated in FIG. 12 the magnet assembly 120 (consisting of magnet 121, inner pole piece 122 and outer pole piece 123) may be used as the moving mass, being driven by electric coil 125, the two being linked by suspension springs 124. A damping element may be included. The compressor to be balanced generates primarily an axial oscillating force. If the compressor is a single unit (i.e. it has no inherent balance) then the force will be large and will dominated by the compressor drive frequency although it will contain higher harmonics. If the compressor is a "balanced" compressor pair, the force will be relatively smaller and will contain a larger ratio of higher harmonics. The active balancer is driven such that the inertial force of the balancer replicates the force generated by the compressor. With appropriate mounting and phase the resulting force when the two are combined is zero and perfect balance is achieved. In practice imperfect matching and mounting will result in a residual imbalance. As is known the moving mass, stroke and spring stiffness values are decided by considerations of force required, frequency and input power. Damping values are decided by consideration of control and stability.

The active balancer illustrated in FIG. 12 is similar to a linear compressor in that it uses spiral suspension springs and a moving coil linear motor. However the magnetic circuit is used as the moving component so that it can also double as a balance mass. In this example there is not a dedicated damper but there will be some damping due to windage and motor losses. For this approach to work well some mechanism is needed to ensure that the correct balancer phase and stroke is maintained for varying compressor operating conditions. The invention solves this problem too.

As illustrated in the right hand half of FIG. 11 the voltage and current waveforms from the active balancer are input into the motor analyser 21a which, in this case, runs a model 65 of the balancer. As in the case of the linear motor, the analyser compares a predicted waveform for one of the voltage and current produced by the balancer model with a corresponding measured waveform measured from the balancer itself. The waveform comparator 31 and global optimiser 33 are used as before to improve the parameters of the balancer model. The balancer model 65 receives a net force waveform as illustrated in FIG. 11 (or an out of balance force waveform in the case of a single compressor) and calculates a drive waveform for the balancer drive 67. The active balancer 63 is then driven with the calculated drive waveform, with the current phase being maintained by reference to a reference waveform from the motor analyser 21'.

As mentioned above and illustrated in the left half of FIG. 11, it is also possible to use two linear motors back-to-back to form a balanced pair. A typical use is in a balanced compressor pair used to generate the pressure pulse for a Stirling cycle cooler. If the compressor halves are perfectly matched and the forces generated are equal and opposite, then there will be no net force and perfect balance will be achieved. In real compressors there is always a degree of mismatch between components, which results in some residual vibration.

For many applications this vibration level will be small enough. For some applications, e.g. in space, it is too large and further steps are taken to reduce it. A typical prior art approach is to measure the residual vibration and to modify the input to one compressor so as to reduce it. The modification is arrived at by adaptive control techniques and requires a detailed characterisation of the compressor pair. This approach requires an accelerometer and its associated electronics together with the control electronics. However, another embodiment of the present invention can also be used to reduce any residual vibration and has the advantage that the accelerometer and its electronics are entirely eliminated. As illustrated in the left-hand half of FIG. 11, a motor analyser 21' is used to determine the force waveform generated by each compressor half 61, 62. These forces are then added to give the net force and hence the residual vibration.

The balance can then be improved in one of two ways:

One method is to use the motor model 29 and the net waveform to derive a modified input waveform for one of the compressor halves 61,62 that will reduce the net force to a minimum.

An alternative method is to use a separate balancer as shown in FIG. 11. In this instance the net force waveform and the balancer motor model 65 are used to derive an input waveform to the balancer 63 so as to generate a balancing force. This approach has the advantage of requiring the balancing drive to handle much smaller powers. In FIG. 11 three motor analysis functions are used, one for each compressor half 61,62 and one for the balancer 63. Although these could be separate processing units, these functions can be fulfilled by a single unit.

The calculation of a vibration-cancelling input for one of a balanced pair or for an active balancer can be based on the use of a parameterised input function, and adjusting the parameter values by an optimisation process so as to minimise the difference between the resulting force variation and the required force-variation. This is analogous to the optimisation process already described: in one approach the input is fixed and the model parameters are varied to match the model values with required values, in another the model is fixed and it is the input function parameters that are varied. An example using a Fourier series is described below for a balanced pair.

A force variation $f_0(t)$ is required of a compressor half. A compressor model has been determined using the motor analyser and the model parameter values are periodically updated. Let the input voltage waveform be defined as a Fourier series:

$$V(t) = a_1 \sin(\omega t) + a_2 \sin(2\omega t) + \ldots + b_1 \cos(\omega t) + b_2 \cos(2\omega t) + \ldots$$

Initial values for parameters $a_1, b_1, \ldots$ etc are readily estimated and the model is used to calculate the resulting force variations $f_m(t)$. This set of values can be compared with the required variation $f_0(t)$ and the parameter $a_1$, $b_1, \ldots$ etc can be optimised to minimise the difference between the two sets of values.

The number of Fourier terms used will determine the final accuracy of the force generated and the time taken to calculate it. It has been found that using the first seven terms of the Fourier series the resulting rms error was less than 0.05%. It is clear from this that only a few terms may be required to achieve the desired accuracy.

In the above embodiments it will be appreciated that the variation of force with position in the linear motor is used to determine the mean motor position. The determination of mean motor position can be enhanced by deliberately designing position-dependent features into the force-position characteristic.

In the description above the force-position characteristic is in the form of look-up tables or sets of equations that are generally fixed inputs—i.e. the parameters varied in the optimisation process do not include force-position characteristic parameters. However, it may be useful in some applications to optimise the force characteristic parameter, for instance to take account of natural manufacturing variation in the properties of the motor components, particularly the magnet energy. It would be advantageous to allow the manufacturing process and subsequent operation to be as tolerant as possible of such variability, but not to have to measure the force characteristic of each compressor motor. A solution to this problem is to make the reasonable assumption that the form of the force-position characteristic is constant, but that the absolute values are determined by a single multiplying parameter Z so that:

$$G(x) = Z \cdot G_{ref}(x)$$

where $G_{ref}(x)$ is a function giving the position dependence. The values of parameters Z for each compressor can then be determined in the optimisation process without having to take any measurements.

It should be appreciated, also, that the use of the model with the parameters being optimised in real-time allows high accuracy to be maintained, even with significant changes in the actual motor parameters for instance because of changes in the environment or operating conditions, or because of a fault developing.

As an example, changes in ambient temperature lead to changes in magnetic energy (from the motor's permanent magnets), spring stiffness, damping, inductance and electrical resistance. In fact, with linear motors it is often found that the force characteristic changes, in particular the curve shown in FIG. 6 moves up and down, though does not appreciably change shape. Thus the force characteristic can be represented by:

$$G(x,T) = Z(T) \cdot G_{Tref}(x)$$

where $G_{Tref}(x)$ is a force characteristic determined at a reference temperature Tref (i.e. $Z(Tref)=1$).

The value $Z(T)$ which is a multiplication factor can therefore be optimised in the same way as the other motor parameters. As well as allowing the invention to adapt to varying operating temperatures it may also be used to estimate the motor temperature.

While the above description has concentrated on using the model to provide the motor stroke and offset (i.e. both the varying and mean components of motor position), the model can provide additional information. As part of the normal operation it calculates the parameters which define the behaviour of the motor and load, such as the spring rate and damping coefficients. Also, the instantaneous values of variables such as position, and all the forces acting in the system with their correct phase relationships to the input voltage are available. These values can be used to calculate other quantities such as the shaft power, efficiency and vibration levels.

It should be noted that it is not necessary to optimise with respect to all parameters all the time. Some parameters change slowly compared to others, e.g. the temperature tends to change slowly. So it is possible to have different modes of operation in which different parameters are optimised. For instance, optimisation with respect to the ambient temperature may only be needed infrequently, e.g. once per hour, with it being regarded as constant between times.

In summary, therefore this embodiment of the invention provides for the monitoring and control of a system, such as a linear electro-mechanical transducer, e.g. a linear electric motor, particularly when driven in a reciprocating manner. A dynamic model of the linear motor and its load is used to calculate from the input drive to the motor a predicted response of the motor. The predicted response is compared to a measured response and the model parameters are varied by global optimisation until the two match as closely as desired. The drive may be the voltage input to the electrical motor and the response may be the electrical current in the motor coils. The variables and parameters of the model, after optimisation, can be taken as good estimates of the actual operating properties of the linear motor. This gives a measurement of such quantities as the stroke and offset of the linear motor. The invention is particularly applicable to the use of linear motors to drive compressors, for instance in Stirling cycle coolers. The system can be applied to balanced pairs of compressors and to compressor systems which use an active balancer to cancel vibration in the system. In this case a balancer model is created and used in an analogous way to the motor model.

Although the techniques of the invention may not operate in real time when establishing the correct values for the model parameters, they can be used in many circumstances to give real time values. For example if a refrigeration compressor is operating with a steady load then the model parameters only need to be updated periodically to maintain an accurate description of the compressor. If the model is used in conjunction with a fast processor it can be run in real time. The model values can then be used as real time measurements.

I claim:

1. A method of monitoring the state of a linearly reciprocating machine comprising an electromechanical transducer in response to an input to the machine by providing an estimate of a value of at least one of a plurality of machine properties including machine variables and machine parameters, the method comprising:
    (a) providing a parametrised model of the machine in which respective model parameters and variables correspond to the plurality of machine properties,
    (b) providing an input to the model corresponding to a value of an input to the machine,
    (c) measuring one of the machine variables to provide a measurement thereof,
    (d) comparing the measurement of one of the machine variables with the corresponding model variable and outputting a measure of a difference between them, (e) optimising the model in an iterative optimisation process by repeatedly varying a plurality of the model parameters corresponding to machine properties while using the same input to the model and comparing the same measurement of one of the machine variables with the corresponding model variable as the plurality of model parameters are varied to reduce the difference, (f) generating a signal representative of an estimate of one of the machine properties other than the measured one of the machine variables based on the value of the model parameter or variable corresponding thereto, and (g) periodically repeating steps (b) to (f) thereby to continuously provide as an output a real-time optimised estimate of the one of the machine properties other than the measured one of the machine variables.

2. A method according to claim 1 wherein the optimising of the model is continued iteratively for a preset number of iterations.

3. A method according to claim 1 wherein the optimising of the model is continued until the measured machine variable has a predetermined relationship with the corresponding model variable.

4. A method according to claim 3 wherein the predetermined relationship is that the difference between the measured machine variable and the corresponding model variable is less than a predetermined value.

5. A method according to claim 1 wherein the comparison between the measured machine variable and corresponding model variable is performed at a plurality of sampling points.

6. A method according to claim 5 wherein the comparison between the measured machine variable and corresponding model variable comprises calculating an RMS difference between them.

7. A method according to claim 5 wherein the comparison between the measured machine variable and corresponding model variable comprises calculating their cross-correlation.

8. A method according to claim 1 wherein the model is optimised by a global optimisation algorithm.

9. A method according to claim 1 wherein the electromechanical transducer is a linear motor.

10. A method according to claim 1 wherein the machine further comprises at least one of a load connected to the electromechanical transducer and a load connected to mounting components for the machine.

11. A method according to claim 1 wherein the input is an electrical drive signal in response to which the transducer produces a mechanical drive, and the measured one of the machine variables is an electrical response to the electrical drive signal.

12. A method according to claim 11 wherein the electrical drive signal is an electrical voltage and the electrical response is electrical current in the transducer.

13. A method according to claim 11 wherein the electrical drive signal is an electrical current and the electrical response is electrical voltage across the transducer.

14. A method according to claim 11 wherein the electrical drive signal is substantially sinusoidal.

15. A method according to claim 1 wherein a force-electrical characteristic of the electromechanical transducer is a function of its position.

16. A method according to claim 1 wherein the model parameters comprise parameters describing mechanical behaviour of the transducer and parameters describing electrical behaviour of the transducer.

17. A method according to claim 16 wherein the parameters describing the mechanical behaviour of the transducer comprise at least one of moving mass, a damping coefficient, a spring rate coefficient and the model variables include an offset representing a mean position of the transducer.

18. A method according to claim 16 wherein the parameters describing the electrical behaviour of the transducer comprise at least one of an effective circuit resistance, an effective circuit inductance, an effective circuit capacitance, and the model variables include an offset voltage.

19. A method according to claim 1 wherein the machine property whose value is estimated is an offset of the transducer.

20. A method according to claim 1 wherein the machine property whose value is estimated is a stroke of the transducer.

21. A method according to claim 1 wherein the estimate of the at least one machine property is calculated from the optimised model.

22. Apparatus for monitoring a state of a linearly reciprocating machine comprising electromechanical transducer in response to an in put to the machine by providing an estimate of a value of at least one of a plurality of machine properties including machine variables and machine parameters, comprising:

a parametrised model of the machine in which respective model parameters and variables correspond to the plurality of machine properties, an input for providing to the model a value corresponding to a value of an input to the machine, a sensor for measuring one of the machine variables to provide a measurement of the one of the machine variables, a comparator for comparing the measurement of one of the machine variables with the model variable corresponding to that machine variable to output a measure of a difference between them, an optimiser for optimising the model in an iterative optimisation process by repeatedly varying a plurality of the model parameters corresponding to machine properties while using the same input to the model and comparing the same measurement of one of the machine variables with the corresponding model variable as the plurality of model parameters are varied to reduce the difference, and an output for providing a signal representative of an estimate of one of the machine properties other than the measured one of the machine variables based on the value of the model parameter or variable corresponding thereto, wherein the apparatus is adapted to periodically repeat operation of the sensor, the comparator, the optimiser and the output, thereby to continuously provide as an output a real-time optimised estimate of the one of the machine properties other than the measured one of the machine variables.

23. Apparatus according to claim 22 wherein the optimiser is adapted to optimise the model iteratively for a preset number of iterations.

24. Apparatus according to claim 22 wherein the optimiser is adapted to optimise the model until the measured machine variable has a predetermined relationship with the corresponding model variable.

25. Apparatus according to claim 24 wherein the predetermined relationship is that the difference between the measured machine variable and the corresponding model variable is less than a predetermined value.

26. Apparatus according to claim 22 wherein the comparison between the measured machine variable and corresponding model variable is performed at a plurality of sampling points.

27. Apparatus according to claim 26 wherein the comparison between the measured machine variable and corresponding model variable comprises calculating an RMS difference between them.

28. Apparatus according to claim 26 wherein the comparison between the measured machine variable and corresponding model variable comprises calculating their cross-correlation.

29. Apparatus according to claim 22, wherein the optimiser is a global optimiser.

30. Apparatus according to claim 22 wherein the electromechanical transducer is a linear motor.

31. Apparatus according to claim 22 wherein the machine further comprises at least one of a load connected to the electromechanical transducer and a load connected to mounting components for the machine.

32. Apparatus according to claim 22 wherein the input is an electrical drive signal in response to which the transducer produces a mechanical drive, and the measured one of the machine variables is an electrical response to the electrical drive signal.

33. Apparatus according to claim 32 wherein the electrical drive signal is an electrical voltage and the electrical response is electrical current in the transducer.

34. Apparatus according to claim 32 wherein the electrical drive signal is an electrical current and the electrical response is electrical voltage across the transducer.

35. Apparatus according to claim 32 wherein the electrical drive signal is substantially sinusoidal.

36. Apparatus according to claim 22 wherein a force-electrical characteristic of the electromechanical transducer is a function of its position.

37. Apparatus according to claim 22 wherein the model parameters comprise parameters describing mechanical behaviour of the transducer and parameters describing electrical behaviour of the transducer.

38. Apparatus according to claim 37 wherein the parameters describing the mechanical behaviour of the transducer comprise at least one of moving mass, a damping coefficient, a spring rate coefficient and the model variables include an offset representing a mean position of the transducer.

39. Apparatus according to claim 37 wherein the parameters describing the electrical behaviour of the transducer comprise at least one of an effective circuit resistance, an effective circuit inductance, an effective circuit capacitance, and the model variables include an offset voltage.

40. Apparatus according to claim 22 wherein said machine property whose value is to be estimated is an offset of the transducer.

41. Apparatus according to claim 22 wherein the machine property whose value is to be estimated is a stroke of the transducer.

42. Apparatus according to claim 22 wherein the estimate of the at least one machine property is calculated from the optimised model.

43. A program embodied on a computer-readable medium, the program, when executed, providing a method of monitoring the state of a linearly reciprocating machine comprising an electromechanical transducer in response to an input to the machine by providing an estimate of a value of at least one of a plurality of machine properties including machine variables and machine parameters, the method using a parametrised model of the machine in which respective model parameters and variables correspond to the plurality of machine properties and the method comprising:
(a) receiving an input to the model corresponding to a value of an input to the machine,
(b) receiving a measurement of one of the machine variables,
(c) comparing the measurement of one of the machine variables with the corresponding model variable and outputting a measure of a difference between them,
(d) optimising the model in an iterative optimisation process by repeatedly varying a plurality of the model parameters corresponding to machine properties while using the same input to the model and comparing the same measurement of one of the machine variables with the corresponding model variable as the plurality of model parameters are varied to reduce the difference,
(e) generating a signal representative of an estimate of one of the machine properties other than the measured one of the machine variables based on the value of the model parameter or variable corresponding thereto, and
(f) periodically repeating steps (a) to (e) thereby to continuously provide as an output a real-time optimised estimate of the one of the machine properties other than the measured one of the machine variables.

44. A method of monitoring the state of a linearly reciprocating machine comprising an electromechanical transducer, in response to an input to the machine, by providing an estimate of a value of at least one of a plurality of machine properties including machine variables and machine parameters, the method using a parametrised model of the machine in which respective model parameters and variables correspond to the plurality of machine properties and the method comprising:
(a) receiving an input to the model corresponding to a value of an input to the machine,
(b) receiving a measurement of one of the machine variables,
(c) comparing the measurement of one of the machine variables with the corresponding model variable and outputting a measure of a difference between them,
(d) optimising the model in an iterative optimization process by repeatedly varying one or more model parameters corresponding to machine properties while using the same input to the model and comparing the same measurement of one of the machine variables with the corresponding model variable as the plurality of model parameters are varied to reduce the difference,
(e) generating a signal representative of an estimate of one of the machine properties other than the measured one of the machine variables based on the value of the model parameter or variable corresponding thereto, and
(f) periodically repeating steps (a) to (e) thereby to continuously provide as an output a real-time optimised estimate of the one of the machine properties other than the measured one of the machine variables.

* * * * *